(12) United States Patent
Izadi et al.

(10) Patent No.: US 10,049,458 B2
(45) Date of Patent: *Aug. 14, 2018

(54) REDUCING INTERFERENCE BETWEEN MULTIPLE INFRA-RED DEPTH CAMERAS

(71) Applicant: Microsoft Technology Licensing, LLC, Redmond, WA (US)

(72) Inventors: Shahram Izadi, Cambridge (GB); David Molyneaux, Oldham (GB); Otmar Hilliges, Cambridge (GB); David Kim, Cambridge (GB); Jamie Daniel Joseph Shotton, Cambridge (GB); Stephen Edward Hodges, Cambridge (GB); David Alexander Butler, Cambridge (GB); Andrew Fitzgibbon, Cambridge (GB); Pushmeet Kohli, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/001,645

(22) Filed: Jan. 20, 2016

(65) Prior Publication Data

US 2016/0163054 A1    Jun. 9, 2016

Related U.S. Application Data

(63) Continuation of application No. 13/017,518, filed on Jan. 31, 2011, now Pat. No. 9,247,238.

(51) Int. Cl.
*G06T 7/00* (2017.01)
*H04N 5/33* (2006.01)
(Continued)

(52) U.S. Cl.
CPC .............. *G06T 7/0065* (2013.01); *G01B 9/08* (2013.01); *G01B 11/22* (2013.01);
(Continued)

(58) Field of Classification Search
None
See application file for complete search history.

(56) References Cited

U.S. PATENT DOCUMENTS 4,215,364 A    7/1980  Takanashi et al.
4,288,078 A    9/1981  Lugo
(Continued)

FOREIGN PATENT DOCUMENTS

CN         201254344 B    6/2010
EP         0583061 A2     2/1994
(Continued)

*Primary Examiner* — Tung Vo
*Assistant Examiner* — Joseph Becker
(74) *Attorney, Agent, or Firm* — Alleman Hall Creasman & Tuttle LLP

(57) ABSTRACT

Systems and methods for reducing interference between multiple infra-red depth cameras are described. In an embodiment, the system comprises multiple infra-red sources, each of which projects a structured light pattern into the environment. A controller is used to control the sources in order to reduce the interference caused by overlapping light patterns. Various methods are described including: cycling between the different sources, where the cycle used may be fixed or may change dynamically based on the scene detected using the cameras; setting the wavelength of each source so that overlapping patterns are at different wavelengths; moving source-camera pairs in independent motion patterns; and adjusting the shape of the projected light patterns to minimize overlap. These methods may also be combined in any way. In another embodiment, the system comprises a single source and a mirror system is used to cast (Continued)

the projected structured light pattern around the environment.

20 Claims, 11 Drawing Sheets

(51) Int. Cl.
  *H04N 13/02* (2006.01)
  *G01B 9/08* (2006.01)
  *G01B 11/22* (2006.01)
  *H04N 5/232* (2006.01)
  *H04N 5/247* (2006.01)

(52) U.S. Cl.
  CPC ......... *H04N 5/23229* (2013.01); *H04N 5/247* (2013.01); *H04N 5/33* (2013.01); *H04N 5/332* (2013.01); *H04N 13/0271* (2013.01)

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 6/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Laenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,852,672 A | 12/1998 | Lu |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,162,075 B2 | 1/2007 | Littlefield et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |

(56) References Cited

U.S. PATENT DOCUMENTS

| | | |
|---|---|---|
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,147,066 B2 | 4/2012 | Nozaki et al. |
| 2004/0145722 A1 | 7/2004 | Uomori et al. |
| 2005/0082480 A1 | 4/2005 | Wagner et al. |
| 2008/0026838 A1 | 1/2008 | Dunstan et al. |
| 2012/0194517 A1 | 8/2012 | Izadi et al. |
| 2012/0268940 A1 | 10/2012 | Sahlin et al. |

FOREIGN PATENT DOCUMENTS

| | | |
|---|---|---|
| JP | 08044490 A1 | 2/1996 |
| JP | 2005210722 A | 8/2005 |
| WO | 93/10708 A1 | 6/1993 |
| WO | 97/17598 A1 | 5/1997 |
| WO | 99/44698 A1 | 9/1999 |

REDUCING INTERFERENCE BETWEEN MULTIPLE INFRA-RED DEPTH CAMERAS

RELATED APPLICATIONS

This application claims priority to U.S. application Ser. No. 13/017,518, filed on Jan. 31, 2011, and entitled "REDUCING INTERFERENCE BETWEEN MULTIPLE INFRA-RED DEPTH CAMERAS." This application claims the benefit of the above-identified application, and the disclosure of the above-identified application is hereby incorporated by reference in its entirety as if set forth herein in full.

BACKGROUND

Infra-red (IR) depth cameras project an invisible IR structured light pattern into the environment which is detected by an IR camera. Objects within the environment cause distortions in the structured light pattern as seen by the camera, which is off-axis compared to the light source and these distortions can be used to resolve depth information about the scene. These cameras, however, have a limited field of view and provide depth information from a single viewpoint so that an object which is close to the depth camera may occlude a large portion of the environment.

One solution which extends the area of the environment which can be mapped is to use more than one IR depth camera. This provides views of the scene from different perspectives and enables a 360° model of an object to be built up, but where the structured light patterns overlap, the accuracy of each IR depth camera is degraded.

The embodiments described below are not limited to implementations which solve any or all of the disadvantages of known IR depth camera systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Systems and methods for reducing interference between multiple infra-red depth cameras are described. In an embodiment, the system comprises multiple infra-red sources, each of which projects a structured light pattern into the environment. A controller is used to control the sources in order to reduce the interference caused by overlapping light patterns. Various methods are described including: cycling between the different sources, where the cycle used may be fixed or may change dynamically based on the scene detected using the cameras; setting the wavelength of each source so that overlapping patterns are at different wavelengths; moving source-camera pairs in independent motion patterns; and adjusting the shape of the projected light patterns to minimize overlap. These methods may also be combined in any way. In another embodiment, the system comprises a single source and a mirror system is used to cast the projected structured light pattern around the environment.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
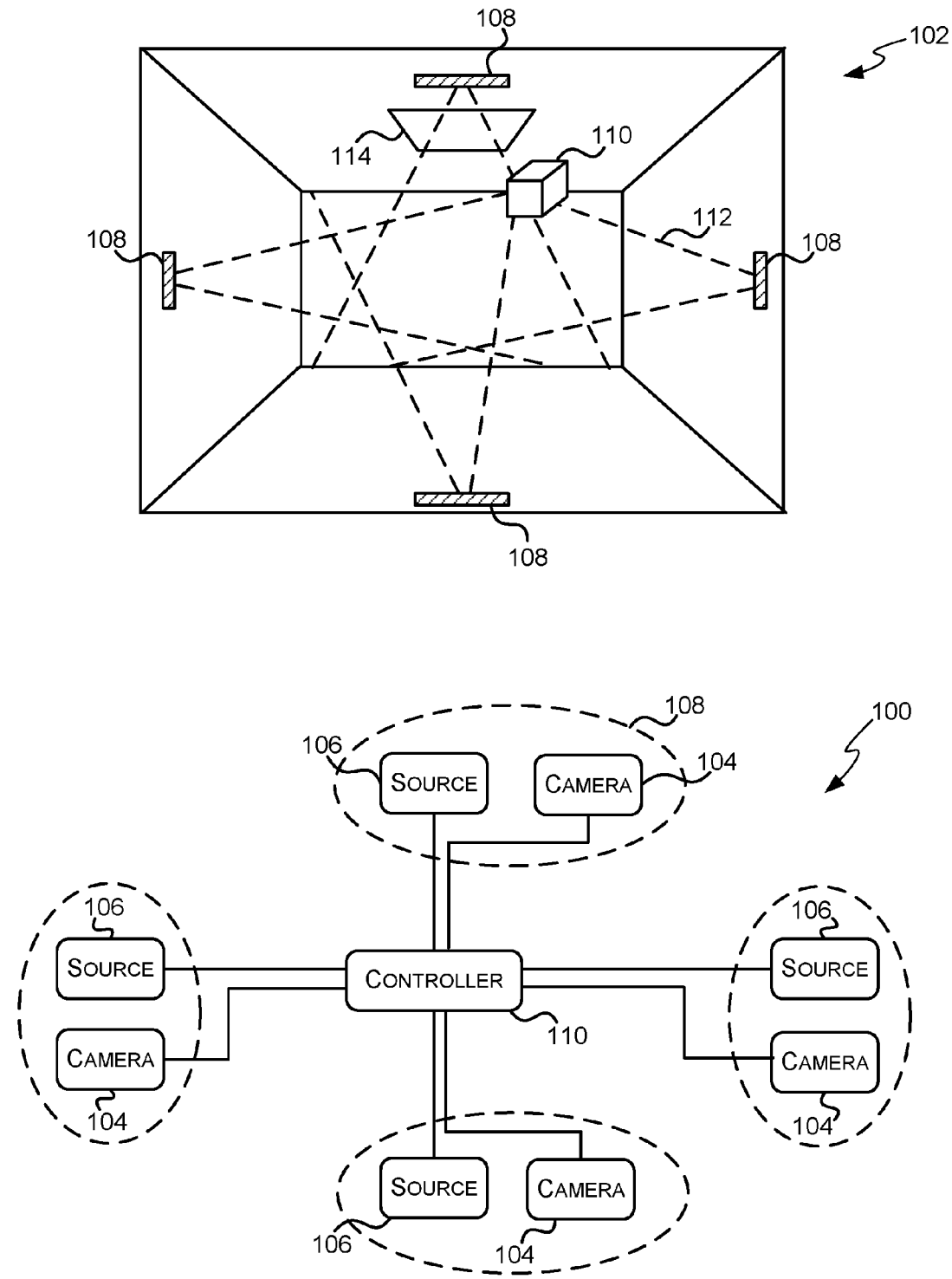
FIG. 1 shows a schematic diagram of an infra-red depth camera system and a perspective view of a room showing an example deployment of the depth camera system.
Figure 2:
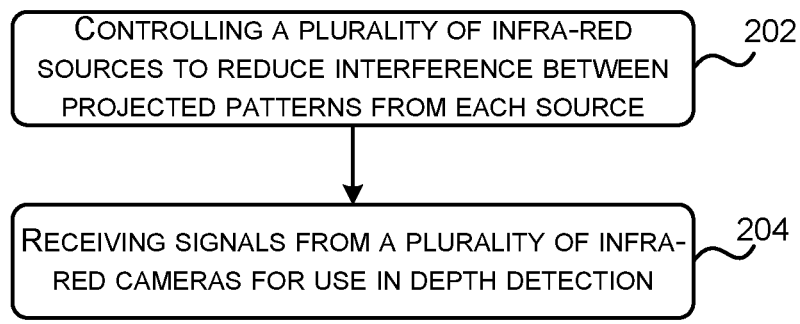
FIG. 2 is a flow diagram of an example method of operation of a depth camera system such as shown in FIG. 1.
Figure 10:
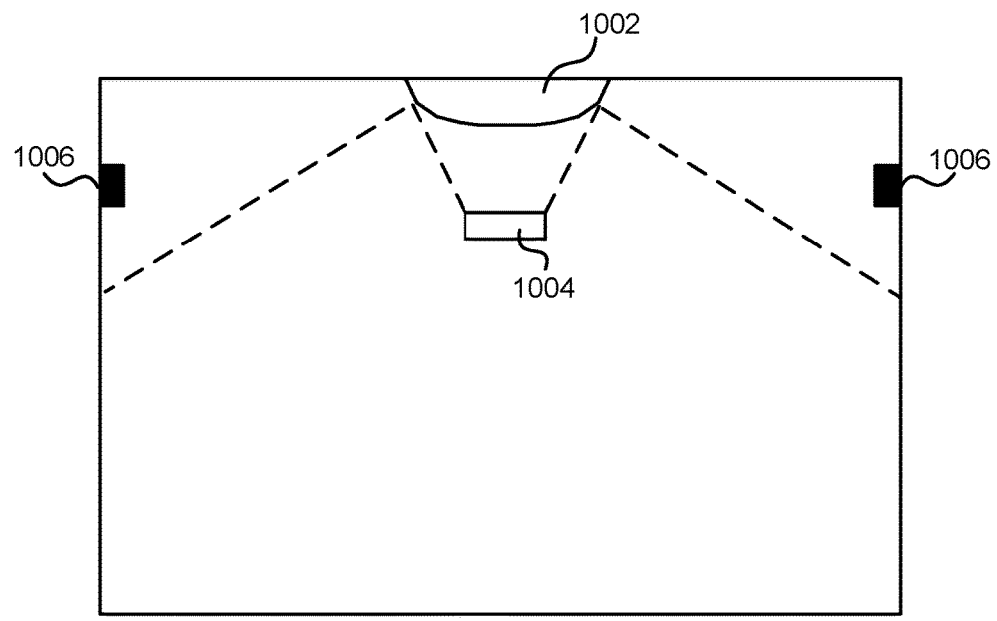
FIG. 10 shows schematic diagrams of an infra-red depth camera system which comprises a single source and multiple cameras.
Figure 10:
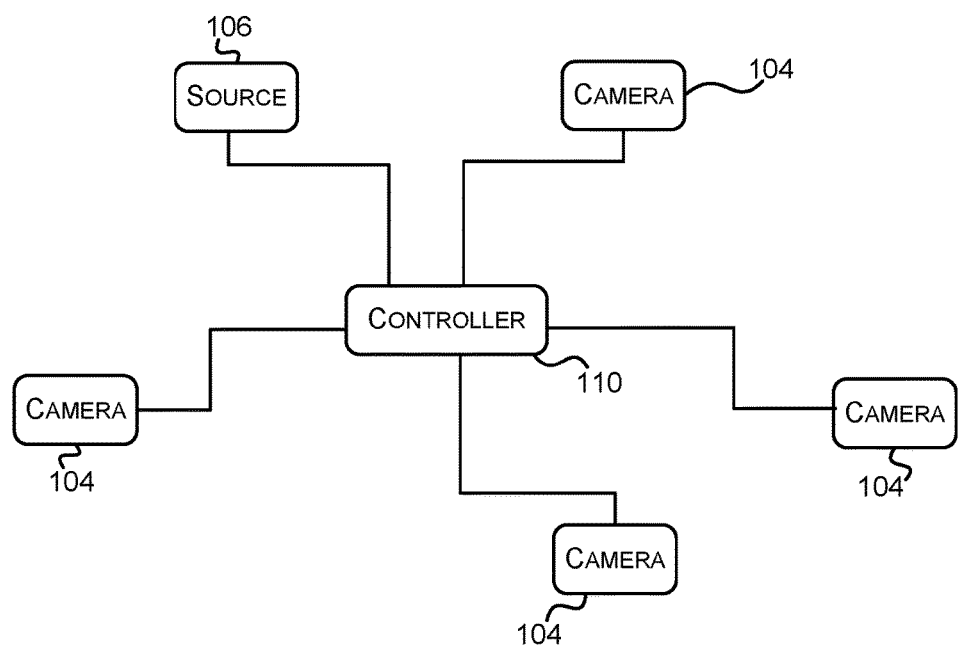

FIG. 1 shows a schematic diagram of an infra-red depth camera system 100 and a perspective view of a room 102 showing an example deployment of the depth camera system 100. FIG. 2 is a flow diagram of an example method of operation of the depth camera system 100 shown in FIG. 1. The system 100 comprises a plurality of infra-red (IR) cameras 104 and a plurality of IR sources 106 (in the drawings four cameras and four sources are shown by way of example only). Each IR source (or illuminator) 106 is arranged to project a structured light pattern which can then be detected by one or more of the IR cameras 104. In the example implementation shown in FIG. 1, the sources 106 and cameras 104 are arranged in pairs comprising a source 106 and a camera 104 (referred to as a source-camera pair) which may be integrated within a single housing 108 (which may be referred to as a depth camera unit), although in other implementations the sources 106 and cameras 104 may be discrete units and there may be different numbers of sources and cameras (e.g. as shown in FIG. 10 where there are multiple cameras and a single source). The sources 106 and cameras 104 are connected to a controller 110, which is a computing device (e.g. a PC or a games console). The sources 106 and cameras 104 may be connected to the controller 110 via wired or wireless links and the sources 106 and cameras 104 may be fixed in position or mobile (or any combination thereof).

The dotted lines 112 in the perspective view of the room 102 in FIG. 1 give an indication of the field of view of each of the cameras 104 and in this implementation the field of view of each camera 104 is partially overlapping with the field of view of at least one other camera. If the structured light pattern projected by an IR source 106 is arranged to cover at least the entire field of view of its associated camera (e.g. in a source-camera pair, the source projects a structured light pattern which covers at least the entire field of view of the associated camera), the structured light patterns from the different sources 106 in FIG. 1 will also be at least partially overlapping. Where these structured light patterns overlap, the accuracy of the depth calculations will be reduced because the IR patterns detected by a camera will be assumed to have originated from a single source (and not from multiple sources producing an overlapping pattern). To reduce any interference which may be caused by overlapping structured light patterns (which may also be referred to as cross-talk between patterns), the controller 110 controls the IR sources 106 (block 202) such that each camera only sees a single projected light pattern at any time. There are many ways in which the sources can be controlled (in block 202) in order to reduce any interference effects which may degrade accuracy of depth determinations and various examples are described below. The depth calculations themselves are made based on signals received at the controller 110 from each camera (block 204).

In a first example, which can be described with reference to FIGS. 3 and 4, the controller 110 controls the sources 106 such that only one source is illuminating a given part of the room (or scene/environment) at any one time. This has the effect that each IR camera only sees one source of illumination at any time. Where all the projected light patterns overlap (e.g. as in the arrangement of FIG. 1), the controller may cycle between all of the structured light sources (block 302 of FIG. 3) and this is shown in the first part 401 of the example timing diagram shown in FIG. 4. This timing diagram shows the operation of each of the four sources 106 shown in FIG. 1 and in the first part 401 of the diagram, each of the sources in turn (1, then 2, then 3, . . . ) illuminates the room (shown as 'on' in FIG. 4) for a period of time and at any point in time only one of the sources is illuminating the room and the other three sources are not (shown as 'off' in FIG. 4).

In parallel with cycling between the structured light sources (in block 302) such that only one source is illuminating a given part of the environment at any time, the controller may also control the operation of the cameras 104 (block 303) such that in a source-camera pair, the camera is only operational when the source is projecting a structured light pattern, i.e. timing diagram for the camera may be the same as the timing diagram for the source. In an alternative implementation, however, the cameras may be operational all the time and may obtain depth information from patterns generated by more than one source, but only from one source at a time. In such an implementation, block 303 in FIG. 3 is omitted and calibration may be performed between each structured light source and each camera. In an example, this calibration may be included as part of any standard calibration of the camera to learn the pattern of structured light. In another example, where the relative transformation (rotation and translation) between pairs of cameras is known, this information may be used to estimate how the structured light pattern from a source in a first source-camera pair would appear in the camera of a second source camera-pair, and no additional calibration of the camera may be required (e.g. only the standard calibration for a single source). In an example, this translation information may be obtained using a mobile depth camera, as described in co-pending US patent application entitled 'Using a three-dimensional environment model in gameplay' filed on the same day as this application and which is incorporated herein by reference in its entirety.

Where all of the projected structured light patterns do not overlap with every other projected pattern, the controller may still cycle between all of the sources (as shown in part 401 of FIG. 4), but alternatively the controller may cycle between sources projecting overlapping patterns or perform any form of time-division multiplexing such that each IR camera only sees one source of illumination at any time. For example, where there are four sources, A, B, C and D, and the patterns from A and C overlap and the patterns from B and D overlap (but the patterns from A and C do not overlap with the patterns from B and D), the controller may operate pairs of sources at a time, e.g. A and B followed by C and D, followed by A and B etc.

In order to stop a source from illuminating the room with a structured light pattern at a particular point in time, the controller may switch off the IR emitter within the source, which may, for example, be an LED (light emitting diode) or VECSEL (vertical-external-cavity surface-emitting laser). Alternatively, a shutter 301 may be used to block the emission of the structured light source, as shown in the schematic diagram 300 in FIG. 3. The shutter may only block the IR source 106 or may alternatively also block the field of view of the associated IR camera 104, such that in a source-camera pair, the field of view of the camera is obscured by the shutter 301 except when the source is projecting a structured light pattern into the environment. Where a shutter is used, this shutter is operated under the control of the controller 110. In another example, an electronically switchable lens in front of the camera may be used to achieve the same functionality (e.g. to replace the shutter) by modulating the focus of the lens. For example, a dynamically switchable lens may be used which changes between a normal "room focus" and a blurred "out of focus" mode. Over time, only the images which are visible during correct focus become integrated into the camera pixels and the out of focus parts add a general blur background to the image. Such a lens may in addition, or instead, be used instead of a shutter in front of a source as projecting a completely blurred pattern has the same effect as turning the projected pattern off. Such an arrangement may be more resilient in some circumstances than using a shutter as no light energy is absorbed in the lens. In use the shutter will absorb light energy and this may result in the shutter getting warm and might lead to failure of the shutter.

Figure 3:
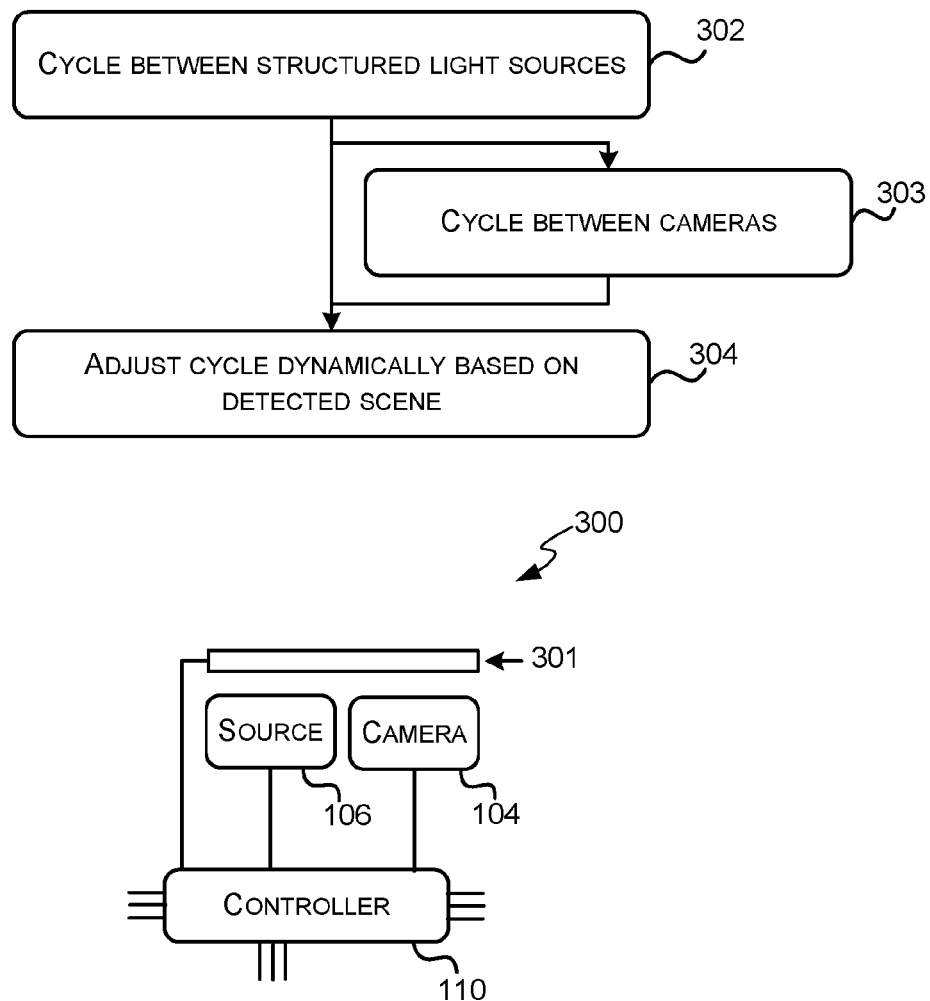
FIG. 3 shows a flow diagram of an example method of reducing interference between sources and a schematic diagram of a source-camera pair.
Figure 4:
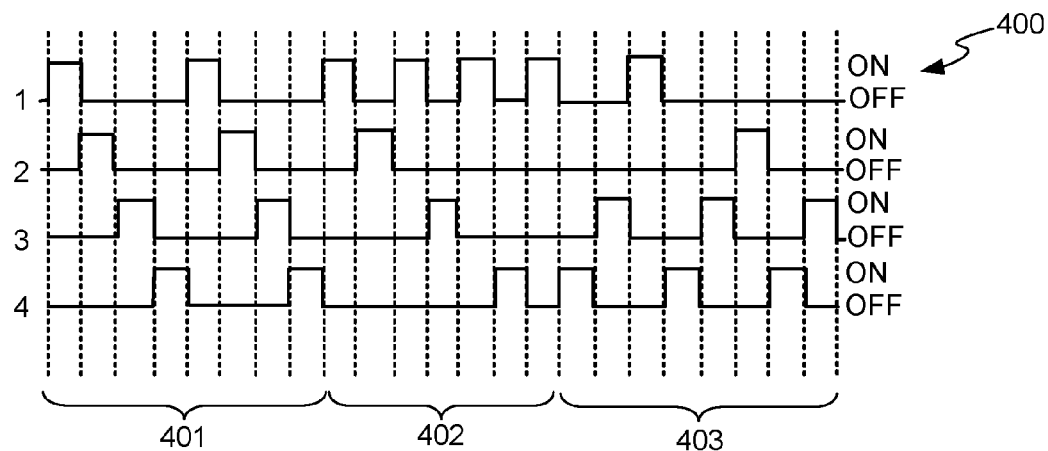
FIG. 4 shows three example timing diagrams for the operation of sources and/or cameras.
Figure 4:
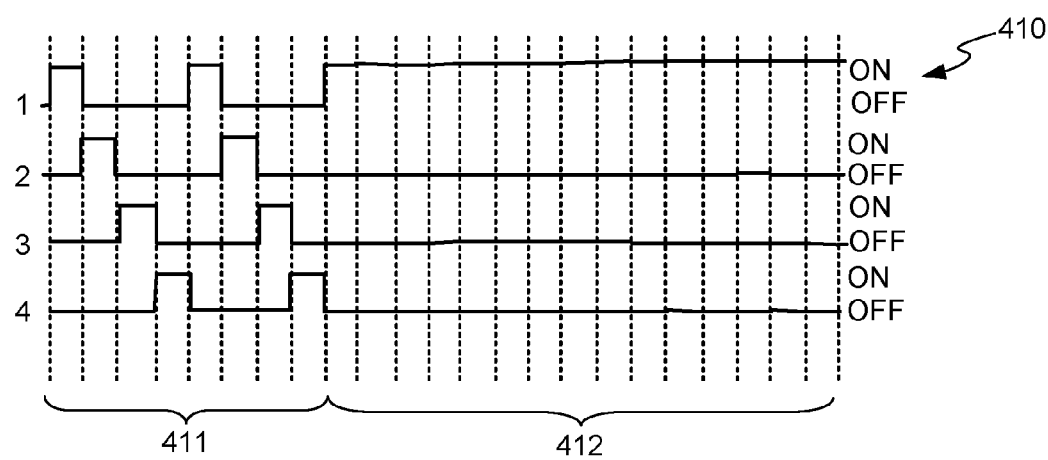
Figure 4:
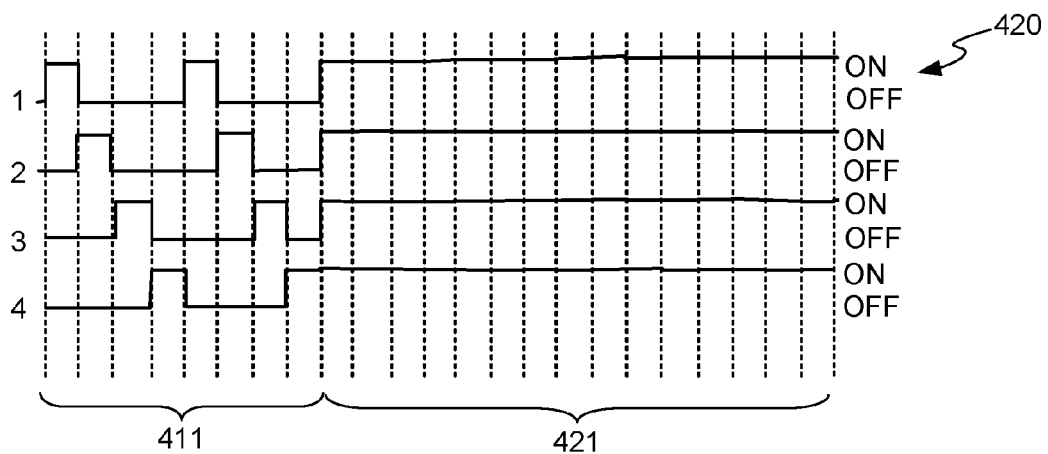

The sequence of cycling through sources may be fixed (e.g. A, B, C, D, A, B, C, D, A, . . . etc) or alternatively the controller may dynamically adjust the cycle, as shown in block 304 of FIG. 3 and the upper timing diagram 400 in FIG. 4, in response to the detected scene. For example, the controller may only sample (i.e. turn on a structured light source and detect the pattern using the camera) at a few Hz if nothing is moving in that part of the scene and may use the extra frames to increase the sampling rate in areas of increased activity. In an example, area-of-interest algorithms may be used to determine which source-camera pairs or which parts of the scene should be sampled more frequently than other pairs/parts and motion provides just one example of a criterion which may be used to adjust the cycle of IR sources (in block 304). For example, the Exemplar algorithm for body part detection may be used followed by an estimate of where the body was facing last time to decide which cameras to activate.

In some examples, the source-camera pairs may be used to generate a dense 3D model of the environment. In this case, the controller may dynamically adjust the cycle according to the dense 3D model being generated. For example, some regions of the dense 3D model may be incomplete or less complete than other regions of the dense 3D model. In that case the controller may dynamically adjust the cycle so that the sampling rate is more frequent for those source-camera pairs which capture required information to complete the 3D model. Any statistic or indicator of the quality of the 3D model being generated may be used as input to the controller. In an example, a rate of change of a distance transform of a 3D volumetric representation of the environment may be used as input to the controller. This can be used to make source-camera pairs more active where these are capturing information about regions of the environment for which the 3D model is noisy, incomplete, or comprises much fine detail.

Referring to the upper example timing diagram 400 in FIG. 4, in the first part 401, the controller cycles through all of the sources and so each view of the scene is given substantially the same amount of time for depth detection. In the second part 402, however, the first source (source 1) is given priority and this may, for example, be because the controller determines that there is movement in the scene detected by the first source-camera pair and no movement in the scenes detected by the other source-camera pairs. This may, for example, be because a user is standing still facing this source-camera pair and moving their hands in front of them. In the third part 403 of the timing diagram, sources 3 and 4 are given priority and sources 1 and 2 illuminate the scene less frequently (e.g. because the user has turned such that their gestures are now visible to cameras 3 and 4 and not to cameras 1 and 2).

In a variation of this example, the multiple source-camera pairs may only be used in an initial phase of operation to generate a high resolution depth map of the background and subsequent to that only a single source-camera pair may be used, as shown in the center timing diagram 410 in FIG. 4. In an example of this, a person may be playing a game which uses a source-camera pair to provide user input to the game and where the graphical user interface of the game is displayed on a large display 114, such as a television, as shown in the arrangement of FIG. 1. In an initial phase 411 of the game, all four source-camera pairs may be used to capture a high resolution view of the room by cycling through the sources (as in block 302 of FIG. 3) and then during game play 412, only the source-camera pair located on the same wall as the display 114 may be used to capture the motion of the person playing the game (source 1 in the example shown in FIG. 4). This enables the background to be scanned (in the initial phase 411) at high accuracy without any interference between structured light patterns and yet provides a higher frame-rate for motion detection during game play (phase 412).

In a further variation, as shown in the lower example timing diagram 420 in FIG. 4, the controller may cycle through the multiple sources (as described above) during the initial phase 411 to generate the high resolution depth map of the background, but during the second phase 421, which in the example above is during game play, all sources may be on (and no measures employed to eliminate interference). This provides the higher frame-rate for motion detection in the second phase and where it is foreground objects (such as the user) which are moving, these are less likely to be illuminated by multiple different sources since they are closer to one of the sources (and so interference effects are likely to be less significant).

In another variation of the first example method of reducing the interference caused by overlapping structured light patterns, (as described above with reference to FIGS. 3 and 4), high speed pseudo-random modulation of both the source and a shutter in front of the camera (e.g. shutter 301 in FIG. 3) may be used to attenuate unwanted signals (i.e. those from other, potentially overlapping structured light patterns) in comparison to the wanted signal (i.e. that from the structured light source projected by the source). In such a variation, a different modulation pattern (or scheme) is used for each source-camera pair and, as described above, the IR emitter within the source may be modulated directly or a shutter used in front of the emitter (or the source) to block the projection of the structured light pattern. As shown in the schematic diagram 300 in FIG. 3, in an example implementation a single shutter 301 may be used in front of both the source 106 and the camera 104. As described above with reference to an earlier example method, an electronically switchable lens where the focus can be modified may be used instead of a shutter in this example and any subsequent examples which describe the use of a shutter.

For the camera, there is another alternative to having a shutter in front of the camera. This alternative is to use electronic shuttering of the capture at the chip level, i.e. the camera pixels only integrate the signal when activated electronically and suitable circuitry may be incorporated in the camera chip to do this. This can be a global function (i.e. a global signal which can alternately freeze or activate the incoming light integration of all pixels in a camera image) but can also be taken to the pixel level (i.e. integration of the light capture for individual pixels can be turned on or off electronically).

Figure 5:
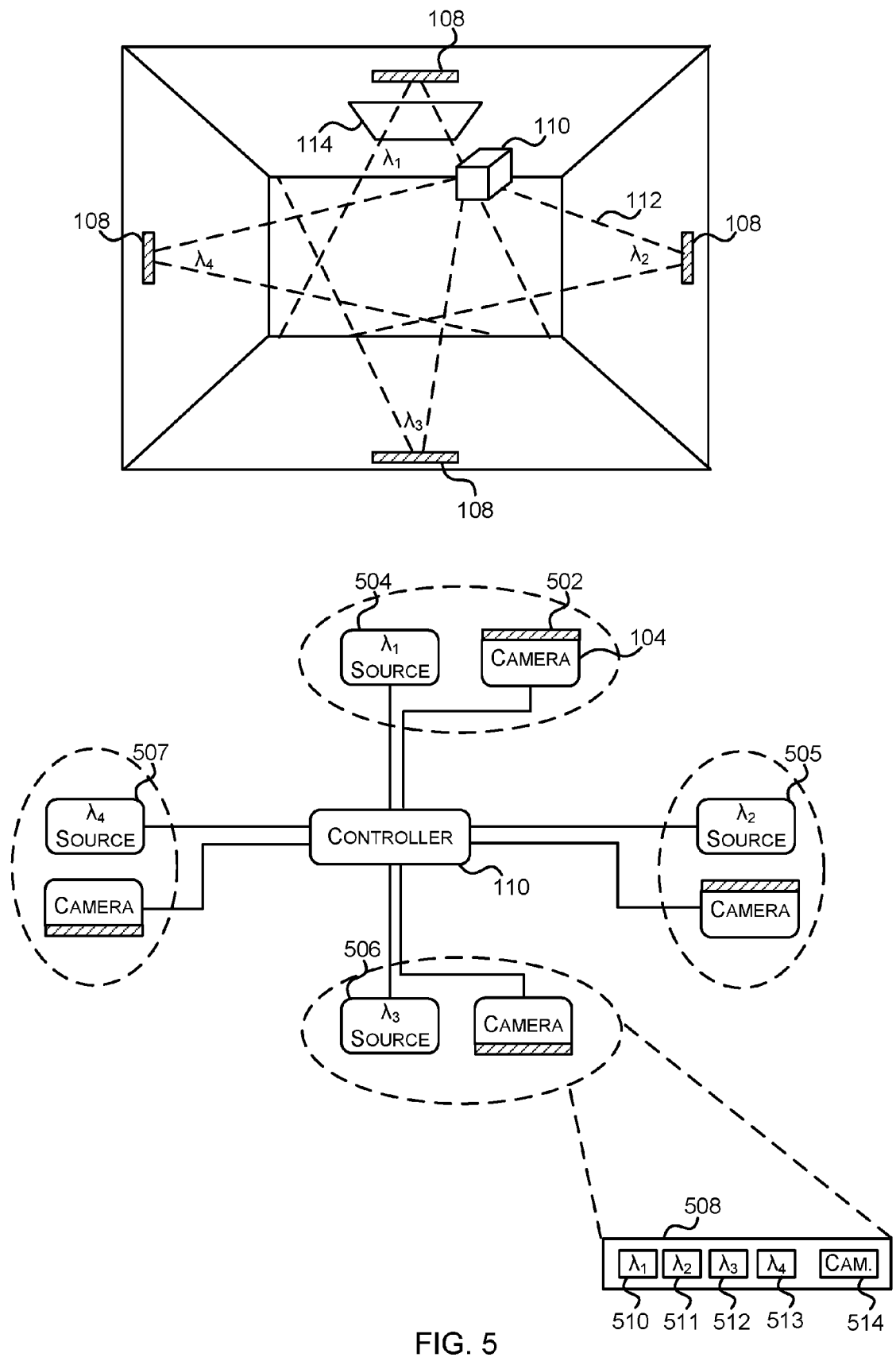
FIG. 5 shows a schematic diagram of another example of an infra-red depth camera system and another perspective view of a room showing an example deployment of the depth camera system.
Figure 6:
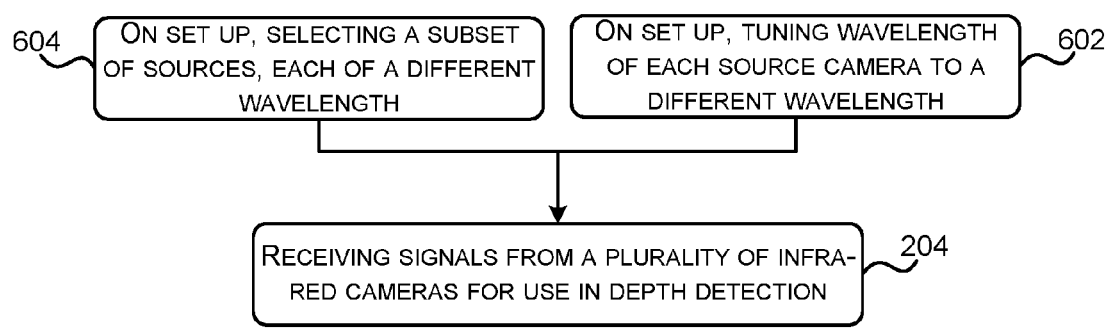
FIGS. 6 and 7 show flow diagrams of further example methods of reducing interference between sources.

In a second example method of reducing the interference caused by overlapping structured light patterns, the source wavelengths may be controlled such that different illumination patterns use different IR wavelengths, ($\lambda_1$-$\lambda_4$ in the schematic diagram of FIG. 5). The wavelength used by a source for the projection of a structured light pattern may be referred to as its operating wavelength. Each camera 104 may be fitted with a wavelength selective filter 502 such that it only sees a single illumination pattern, e.g. the pattern at the wavelength emitted by the source 504-507 in the source-camera pair. The control of the emitted wavelength (by the sources 504-507) and the control of the wavelength of the camera filters 502 may be performed manually when the system is installed or alternatively, the wavelength control may be dynamic through the use of tunable elements or the selection from sets of elements (e.g. emitters, sources, cameras and/or filters) operating at different wavelengths. As shown in the example flow diagram of FIG. 6, one option is to tune the wavelength of each source-camera pair on set-up so that overlapping patterns are at different wavelengths (block 602) and another option is to select a particular source and/or camera from a sets of sources and/or cameras of different wavelengths within a single housing (block 604). This tuning or selection may be performed electrically under the control of the controller 110. The system diagram in FIG. 5 shows a single housing 508 which comprises a plurality of sources 510-513 at different wavelengths and a single camera 514 comprising an electrically tunable wavelength filter. In the set up phase, the controller can select one of the sources 510-513 (block 604) and tune the filter in the camera 514 (block 602) to the wavelength of the selected source. Alternatively, there may be multiple filters, one corresponding to each of the wavelengths of the sources 510-513, mounted in a movable (e.g. rotatable) housing such that a filter can be selected with a wavelength that is the same as the selected source and then the selected filter can be moved into position in front of the camera. In another variation, there may be multiple sources 510-513 of different wavelengths and multiple cameras, one camera operating at each of the wavelengths of the sources 510-513 and a source-camera pair of a particular wavelength may be selected within each housing 508.

Figure 7:
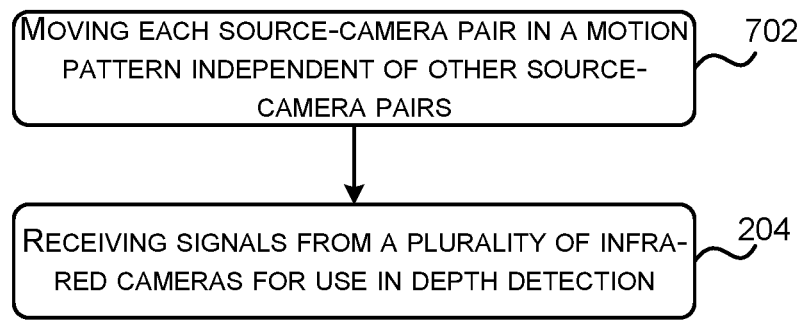
Figure 8:
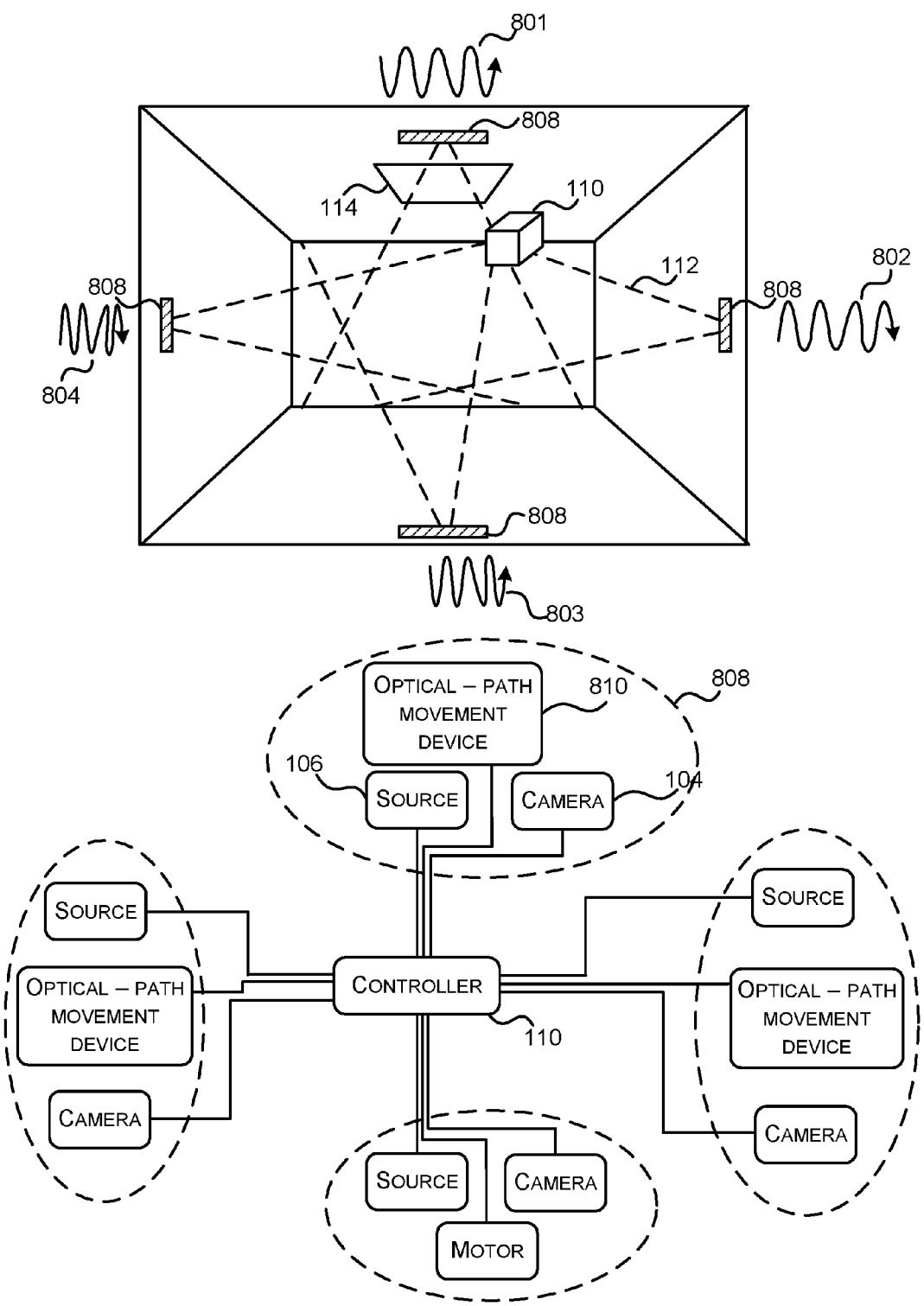
FIG. 8 shows a schematic diagram of a further example of an infra-red depth camera system and a further perspective view of a room showing an example deployment of the depth camera system.

A third example method of reducing the interference caused by overlapping structured light patterns is shown in FIG. 7, which is a modified version of the flow diagram shown in FIG. 2 and described above. In this example, the effects of interference between projected structured light patterns are reduced by moving each source-camera pair in a manner which is different to the motion of any other source-camera pairs with overlapping light patterns (block 702). In the example deployment as shown in FIG. 8, all of the four light patterns overlap and therefore each source-camera pair within a housing 808 is moved according to a different motion pattern 801-804. As shown in the lower schematic diagram 800 in FIG. 8, each housing 808 additionally comprises an optical-path movement device 810 or other means for generating the required motion of the source-camera pair. For example, the optical-path movement device 810 may be a motor, an electro mechanical device, an electro optical device or an electrostatic device which is able to move the optical-path of the source-camera pair. If a source-camera pair is moved around, it will see the environment moving in a corresponding manner, but the illumination pattern will be fixed relative to the camera. Noise which may have been introduced by other sources projecting overlapping structured light patterns, whether fixed or moving, will tend to be rejected or blurred out as it will not correlate consistently as a 3D model of the environment is built up using the depth data from the source-camera pair. The motion patterns may be in a single axis or in multiple axes. In an example, the source-camera pairs may each be shaken in an independent way and in another example, the source-camera pairs may be moved more slowly, e.g. by sweeping them from side to side. This example method therefore uses motion to blur all the other illumination patterns apart from the one illumination pattern produced by the source which is rigidly tied to the camera and which shares the same motion as the camera (i.e. the other half of a source-camera pair).

In an implementation of this third example method, the motion of each source-camera pair may be continuous during the operation of the system, such that there are no motion dead-spots. For example, a circular motion is continuous in time whereas an up-down motion has two points in the motion (at the top and bottom extremes) where the source-camera pair reverses its motion and therefore if at this particular instant, another camera images the pattern, there is a small possibility that the pattern is in fact not seen to be moving.

In addition, the motion patterns used for source-camera pairs may be adaptively assigned or synchronized between source-camera pairs such that no neighboring source-camera pairs share a common motion frequency/speed. For example, neighboring source-camera pairs may be allocated circular speeds which share no common detectable harmonics (e.g. one pair may move at 100 Hz circles and a neighboring pair may move at 101 Hz circles).

Figure 9:
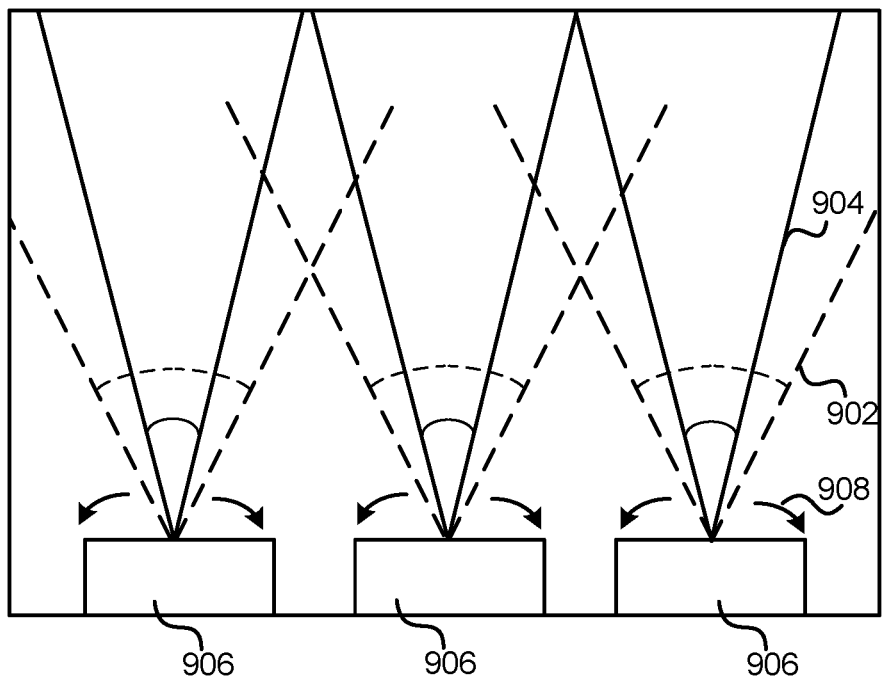
FIG. 9 shows a schematic diagram of another example method of reducing interference between sources.

In a fourth example method of reducing the interference caused by overlapping structured light patterns, the controller may use shutters or an adjustable aperture to control the shape of the projected structure light patterns from one or more of the sources. The shutters may be electronic, electro mechanical, electrostatic or any kind of electro-optical device. By reducing the angle of the projected light pattern, as shown in the schematic diagram of FIG. 9, overlap of patterns can be reduced or eliminated. In FIG. 9, the angle of emission from each source (and hence the coverage of the projected light pattern) has been reduced from that shown by the dotted lines 902 to that shown by the solid lines 904 where no overlap occurs. It can be seen from FIG. 9, however, that by reducing the angle of emission, there are parts of the scene that are no longer covered by any of the sources and hence depth information in these parts will not be available. This may be addressed by sweeping the three source-camera pairs 906 from side to side (as indicated by the arrows 908) together in a coordinated motion, such that the patterns remain non-overlapping but together they sweep through the entire volume of interest (e.g. the whole room).

In a variation of this fourth example method, the overlaps of patterns may be minimized but not eliminated. In such an example, a subset of the source-camera pairs (or a subset of just the sources) may be moved in a vertical sweeping pattern and another subset of the source-camera pairs (or just sources) may be moved in a horizontal sweeping pattern which results in small regions of overlap for short periods of time.

The sweeping or selective projection methods described above may be implemented using a projector, such as a Digital Micromirror Device (DMD)/Digital Light Processing (DLP) projector, as the source since such a device is effectively a shutter arranged at the pixel level.

In a further example method of reducing the interference caused by overlapping structured light patterns, a single illumination source 1004 may be used in combination with multiple IR cameras 1006, as shown in FIG. 10. An arrangement of mirrors 1002 may be used to reflect (or cast) the structured light pattern around the room (e.g. in a 'disco ball' style arrangement) or alternatively the illumination source 1004 may be mounted on a moveable (e.g. rotatable) mount so that it can sweep around the room and in such an implementation, the operation of the cameras 1006 may be synchronized with the motion of the single illumination source 1004.

In addition to using any of the techniques described above, each housing 108, 508, 808 (which may also be referred to as a depth camera unit) may also include a camera which operates in the visible spectrum (e.g. a VGA camera with a resolution of 640×480) and the RGB data from this camera (given that the depth camera and the RGB camera are calibrated to each other) may be used to discriminate between noise and actual objects, leveraging texture consistency in the RGB image where there are holes in the depth map (e.g. due to very poor depth data in regions of interference). For example, if the RGB image is smooth (in color or texture) but there is a (small) hole in the depth map, the hole may be filled by 'flood filling' or by using other similar approaches using valid depth measurement from the hole contour points or a small local area. The presence of holes may also provide information on the amount of noise in the signal since these holes are generally the result of a camera being unable to correlate a recognizable pattern (because of interference). The RGB information may also be used to help in the selection of which camera and/or light source to use.

Figure 11:
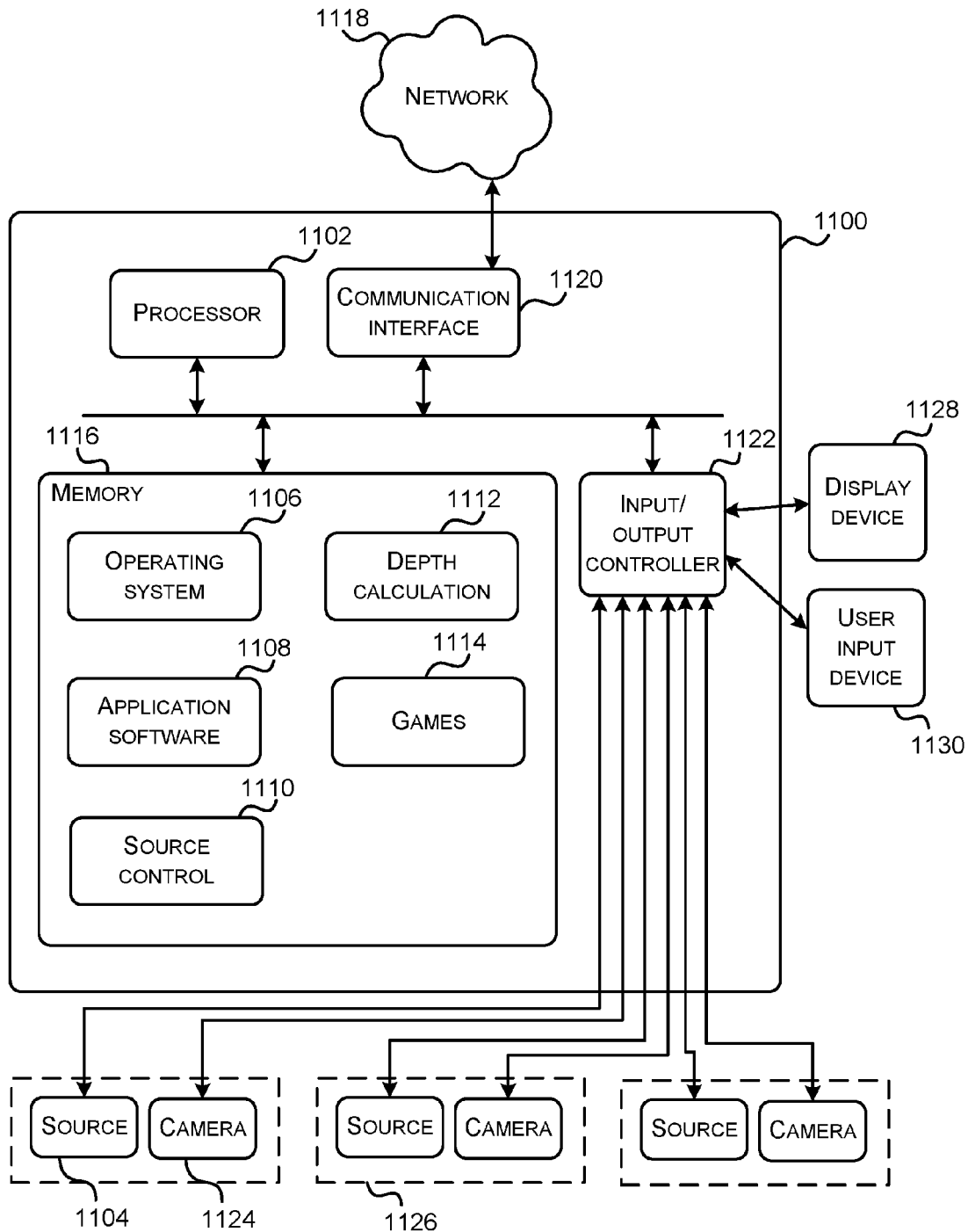
FIG. 11 illustrates an exemplary computing-based device in which embodiments of the control methods described herein may be implemented.

FIG. 11 illustrates various components of an exemplary computing-based device 1100 which may be implemented as any form of a computing and/or electronic device, and which may operate as a controller 110, as described in the various examples above.

Computing-based device 1100 comprises one or more processors 1102 which may be microprocessors, controllers or any other suitable type of processors for processing computing executable instructions to control the operation of the device in order to control a plurality of infra-red sources 1104 to reduce interference between projected structured light patterns from each source. In some examples, for example where a system on a chip architecture is used, the processors 1102 may include one or more fixed function blocks (also referred to as accelerators) which implement a part of the method of control in hardware (rather than software or firmware). Platform software comprising an operating system 1106 or any other suitable platform software may be provided at the computing-based device to enable application software 1108-1114 to be executed on the device. The application software may include a source control module 1110, a depth calculation module 1112 and games 1114 or other applications in which the calculated depth information is used.

The computer executable instructions may be provided using any computer-readable media that is accessible by computing based device 1100. Computer-readable media may include, for example, computer storage media such as memory 1116 and communications media. Computer storage media, such as memory 1116, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Although the computer storage media (memory 1116) is shown within the computing-based device 1100 it will be appreciated that the storage may be distributed or located remotely and accessed via a network (e.g. network 1118) or other communication link (e.g. using communication interface 1120). In some examples, the control functionality may be implemented in a distributed manner across multiple computing-based devices and in such an implementation, the communication interface 1120 may be used to discover and connect with other devices over the network 1118.

The computing-based device 1100 also comprises an input/output controller 1122 arranged to send control signals to the IR sources 1104 and to receive signals from a plurality of IR cameras 1124. As described above, the sources 1104 and cameras 1124 may be arranged in source-camera pairs, with each source-camera pair being co-located within a single housing 1126. The input/output controller 1122 may also be arranged to output display information to a display device 1128 which may be separate from or integral to the computing-based device 1100. The display information may provide a graphical user interface (e.g. for the operating system 1106, games 1114 or other application software 1108-1112). The input/output controller 1122 may also be arranged to receive and process input from one or more devices, such as a user input device 1130 (e.g. a games controller, mouse or keyboard). This user input may be used to play the game 1114. In an embodiment the display device 1128 may also act as the user input device 1130 if it is a touch sensitive display device.

The input/output controller 1122 may also be arranged to output control signals to motors (not shown in FIG. 11) co-located with a source-camera pair within a housing 1126, where motion is used to reduce the interference (e.g. as described above with reference to FIGS. 7 and 8). The input/output controller 1122 may also output data to devices other than the display device, e.g. a locally connected printing device (not shown in FIG. 11).

It will be appreciated that the connections, shown by double-ended arrows in FIG. 11, are intended to indicate possible connections between elements of the computing device and communication between elements may be via other routes and communication may be unidirectional or bidirectional. Additionally, the links between elements may be via physical connections (e.g. over wires) or may be wireless (e.g. the sources 1104 and cameras 1124, or the source-camera pairs, may communicate with the computing device 1100 over WiFi or Bluetooth® or may use another wireless protocol).

The examples described above use IR sources and IR cameras; however, it will be appreciated that in other examples, sources and cameras using other human-visible or non-visible wavelengths (e.g. ultra-violet) may be used to provide a structured light pattern and camera capture of that pattern.

Although the present examples are described and illustrated herein as being implemented in a room-based system for using in gaming, the system described is provided as an example and not a limitation. As those skilled in the art will appreciate, the present examples are suitable for application in a variety of different types of systems and for many different applications (e.g. for any virtual/augmented reality applications, telepresence etc).

Furthermore, although in the examples shown above, a single controller 110 is shown, the functionality of the controller may be distributed across multiple computing-based devices, for example, the control functionality for some of the sources may be performed by one controller and the remaining sources may be controlled by a second controller. The two controllers may communicate in order to coordinate their actions (e.g. using out-of-band communications such as wireless radio, wired communications or global modulation and detection of an optical signal). In such an example, one controller may be the master and the other controllers may act as slaves to the master controller and in some embodiments, the role of master may be a dynamically assigned function of one of the depth camera units.

In another example, the source/camera components may be used to perform this distributed timing/synchronization mechanism. In such an example, when a source-camera pair powers up it first monitors the scene (without illuminating the scene), looking for some kind of frame sync pattern (or a clear broadcast slot) from the one or more source-camera pairs which may have already been operating in its field of view. It then can, for example, insert itself into the timing sequence by optically signaling (e.g. through illuminating) a notification of its presence. In an example, this signaling may be performed by illuminating the overlap regions during the broadcast slot. This "I'd like to join" signal which those source-camera pairs which are already operating can notice triggers these source-camera pairs to extend their timings to accommodate a new time slot for the newly powered up source-camera pair, with the broadcast/sync slot preserved to enable other source-camera pairs to further join in. By using the source-camera pairs, instead of out-of-band communications, relatively independent groups of source-camera pairs can be identified. For example, a group of source-camera pairs at the far end of a huge room would be able to figure out they do not interfere or overlap with a group of source-camera pairs at the near end of a room.

The examples above describe a depth camera system which covers a single room; however in other examples, the system may cover a larger area such as spanning a whole building. In such an example, there may be many more source-camera pairs (or depth camera units) and the system may use distributed clock synchronization or a centralized controller to minimize any effects of variation in individual camera/source timing and network latencies. In an example, all cameras may be locked to a common timing reference.

It will also be appreciated that although each of the examples is described separately above, any of the techniques may be used in combination with one or more of the other techniques described. For example, a combination of time-division multiplexing (as described above with reference to FIGS. 3 and 4) and wavelength-division multiplexing (as described with reference to FIGS. 5 and 6) may be used where there are many source-camera pairs with overlapping fields of view to reduce the complexity of the cycling required between sources and to increase the frame rate in any particular part of the room. For example, referring to the arrangement shown in FIG. 5, instead of the four sources 504-507 operating at four different wavelengths ($\lambda_1$-$\lambda_4$), two wavelengths ($\lambda_1$-$\lambda_2$) may be used, with two sources operating at each of the wavelengths and the controller may then cycle between sources operating at $\lambda_1$ and sources operating at 22.

The methods described above reduce the interference that is caused by overlapping structured light patterns that are detected by IR cameras when using such patterns to detect depth in the environment. The techniques described enable each depth camera to operate at, or nearer to, their ideal performance level in the presence of multiple depth cameras.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A depth camera system comprising:
a plurality of cameras with at least partially overlapping field of views;
a plurality of sources, each arranged to project a structured light pattern; and
a controller arranged to control a plurality of source-camera pairs to reduce the interference between projected structured light patterns and to receive signals from each of the cameras for use in depth determination, controlling a plurality of source-camera pairs comprising controlling a plurality of sources and a plurality of cameras, the controller being further arranged to control the movement of a source-camera pair relative to other source-camera pairs such that the structured light pattern projected by the source is fixed relative to the camera.

2. A depth camera system according to claim 1, wherein the plurality of cameras comprise infra-red cameras and wherein the plurality of sources comprise infra-red sources, each arranged to project an infra-red structured light pattern.

3. A depth camera system according to claim 1, wherein the controller is arranged to cycle between sources with overlapping structured light patterns.

4. A depth camera system according to claim 1, wherein the controller is arranged to cycle between source-camera pairs with overlapping structured light patterns, the controller being further arranged to adjust the cycle dynamically based on motion detected by at least one source-camera pair.

5. A depth camera system according to claim 3, wherein the controller is arranged to adjust the cycle dynamically based on the signals received from each of the cameras.

6. A depth camera system according to claim 3, wherein the controller is arranged to cycle between sources with overlapping structured light patterns in a first phase of operation and to operate a single source in a second phase of operation.

7. A depth camera system according to claim 3, wherein the controller is arranged to cycle between sources with overlapping structured light patterns in a first phase of operation and to operate all of the sources in a second phase of operation.

8. A depth camera system according to claim 1, further comprising a plurality of depth camera units, each unit comprising at least one source and at least one camera and wherein the controller is arranged to set an operating wavelength of each depth camera unit, such that at least some overlapping structured light patterns are at different operating wavelengths.

9. A depth camera system according to claim 8, wherein each unit comprises at least one wavelength tunable element and wherein the controller is arranged to tune the at least one wavelength tunable element to set an operating wavelength of each depth camera unit.

10. A depth camera system according to claim 8, wherein each unit comprises a plurality of sources with different operating wavelengths and wherein the controller is arranged to select one of the plurality of sources to set an operating wavelength of each depth camera unit.

11. A depth camera system according to claim 8, wherein each unit comprises a plurality of cameras with different operating wavelengths and wherein the controller is arranged to select one of the plurality of cameras to set an operating wavelength of each depth camera unit.

12. A depth camera system according to claim 1, wherein the controller is arranged to move each source-camera pair in a motion pattern which is different from motion patterns of other source-camera pairs.

13. A depth camera system according to claim 12, further comprising a plurality of depth camera units, each unit comprising a source-camera pair and an optical-path movement device arranged to move the source-camera pair under control of the controller.

14. A depth camera system according to claim 1, wherein the controller is arranged to modulate each source-camera pair with a different pseudo-random modulation pattern.

15. A depth camera system according to claim 1, wherein the controller is arranged to control a shape of each projected structured light pattern to reduce overlap of patterns when all of the sources are projecting a structured light pattern simultaneously.

16. A computer-implemented method of controlling a depth camera system, the system comprising a plurality of infra-red cameras and a plurality of infra-red sources, and the method comprising:
controlling a plurality of source-camera pairs to reduce interference between projected infra-red structured light patterns from each source, controlling the plurality of source-camera pairs comprising controlling a plurality of infra-red cameras and a plurality of infra-red sources;
controlling the plurality of source-camera pairs including controlling the movement of a source-camera pair relative to other source-camera pairs such that the infra-red structured light pattern projected by the infra-red source belonging to the pair is fixed relative to the infra-red camera belonging to the pair; and
receiving signals from the plurality of infra-red cameras for use in depth determination.

17. A computer-implemented method according to claim 16, wherein controlling the plurality of infra-red sources comprises cycling between infra-red sources with overlapping structured light patterns.

18. A computer-implemented method according to claim 17, wherein controlling the plurality of infra-red sources further comprises dynamically adjusting a cycle used for cycling between infra-red sources based on a dense 3D model of an environment of the depth camera system which is formed using signals from the plurality of infra-red cameras.

19. A computer-implemented method according to claim 16, wherein the system further comprises a plurality of depth camera units, each unit comprising at least one infra-red source and at least one infra-red camera and wherein controlling the plurality of infra-red sources comprises setting an operating wavelength of each depth camera unit, such that overlapping structured light patterns are at different operating wavelengths.

20. A depth camera system comprising:
a plurality of depth camera units, each unit comprising an optical-path movement device and a source-camera pair, the source-camera pair comprising an infra-red camera and an infra-red source arranged to project an infra-red structured light pattern; and
a computing-based device comprising:
a processor and a memory, wherein the memory is arranged to store device-executable instructions which, when executed, cause the processor to control the optical-path movement device to move the optical path of each source-camera pair in a motion pattern such that movement of the infra-red structured light pattern projected by the source in a source-camera pair is fixed relative to the camera in the source-camera pair, the motion pattern for the depth camera unit being different from the motion pattern of every other depth camera unit in the plurality of depth camera units.

\* \* \* \* \*